Patented Mar. 26, 1946

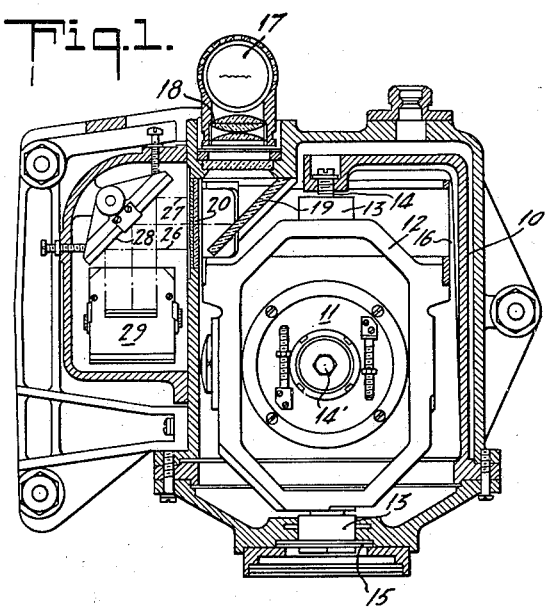

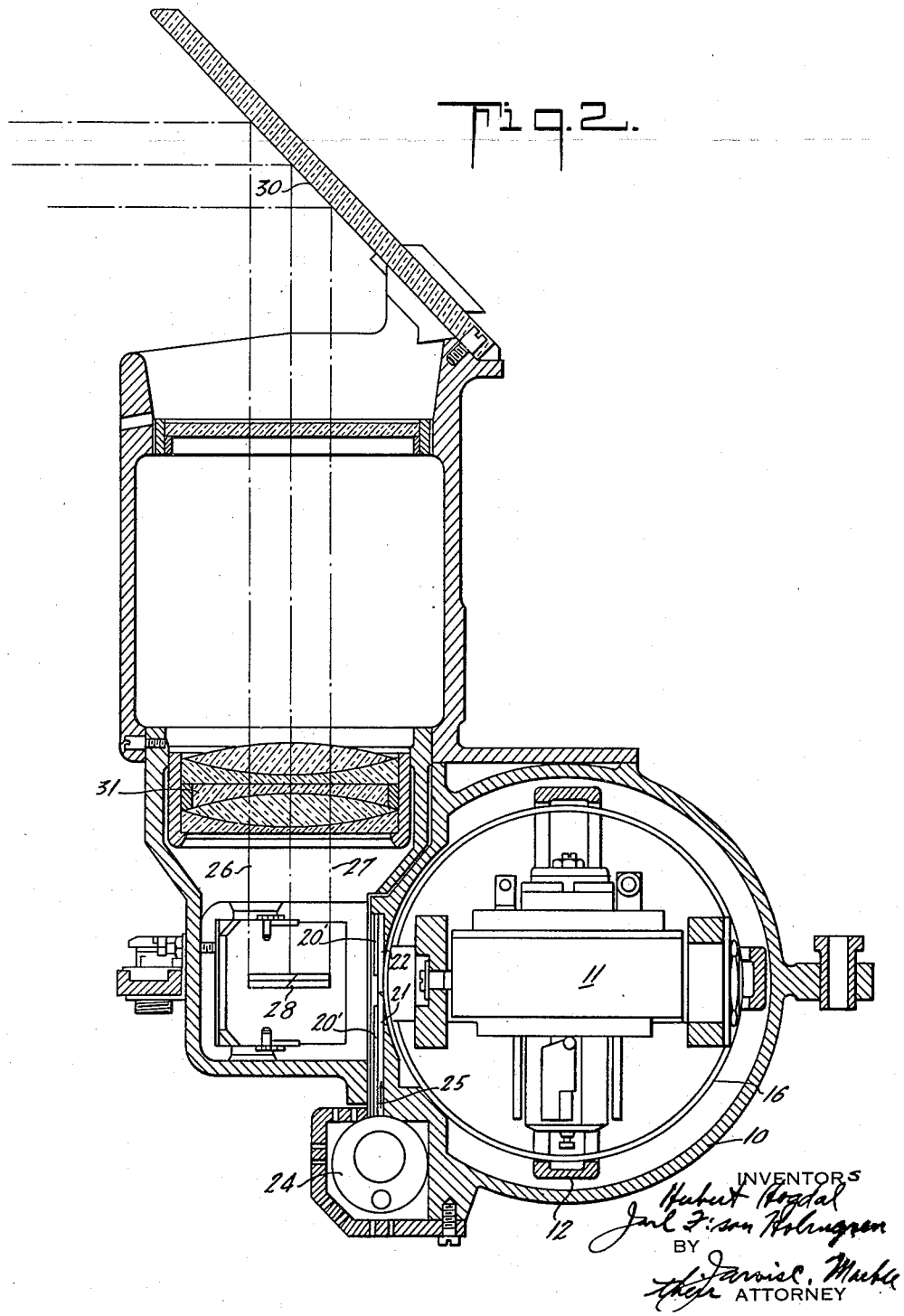

2,397,354

UNITED STATES PATENT OFFICE 2,397,354

ARRANGEMENT IN SIGHT APPARATUS FOR DROPPING OBJECTS FROM THE AIR

Herbert Hogdal and Jarl F:Son Holmgren, Stockholm, Sweden

Application June 30, 1942, Serial No. 449,190
In Sweden March 26, 1942

5 Claims. (Cl. 88—1)

Our invention relates to bomb sights for use in aiming bombs dropped from aircraft.

It is known to provide bomb sights or the like with a gyroscopically guided part, maintaining a fixed sight position independently of the position of the aircraft on which the sight is mounted. When changing the vertical direction of said aircraft, and consequently changing the direction of movement of the aircraft, the gyroscope by means of gearing influences the sight means, so that the latter assumes a position, corresponding to the new direction of entrance in the falling curve. However, it has proved that it was very difficult to make the mechanical transfer arrangement with sufficient precision, as the falling curve, as known, due to the air resistance and other reasons, does not follow any mathematical law as far as is known, but preferably has to be fixed in a purely empirical way, whereas it is impossible to produce a simple mechanical transfer which follows this curve, and even difficult to produce a more complicated mechanical transfer, which follows the curve with the degree of precision desired.

The present invention, therefore, is based on the principle that the sight means obtains an optical indication of the direction, said indication also containing a curve, drawn by guidance of empirically obtained knowledge of the nature of the falling curve. According to the invention, the gyro arrangement is combined with a scale which is movable in relation to a fixed indication, the scale as well as the fixed indication being arranged to be optically reproduced on a semi-transparent reading plate contained in the sight apparatus, the scale thereby containing such curves reproducable on the reading plate, that at any direction in the vertical plane of the aircraft these curves in combination with the fixed indication, state the point on the target area where the object dropped will hit. The invention is in the following described in connection with one form of execution, Figs. 1 and 2 showing a sight apparatus in accordance with the invention in horizontal section and in vertical section, respectively, whereas Fig. 3 shows a detail of the arrangement, Fig. 3a is a top view of Fig. 3, and Fig. 4 shows the above mentioned scale, developed in the plane, with the curves and scales, drawn thereon.

In Figs. 1 and 2, 10 indicates a casing, within which a gyroscope 11 is movable. The gyroscope is guided in a cardanic frame 12, turnable about the shaft 13 which is pivoted at 14 and 15. On the cardanic frame there is further arranged a cylindrical drum 16, the axis of which is normal to the axis 14' of the gyroscope, which drum in a manner to be described below carries a graphic indication.

A source of light is arranged at 17, and light emitted therefrom is conducted by means of a condenser lens system 18 onto the stationary mirror 19, placed at an angle of 45° to the path of light from the lens and located within the drum 16. By means of the mirror the rays of light are deflected, so that they pass through transparent markings on the otherwise opaque drum 16, and then through a stationary plate of glass 20 mounted in an opening in the casing, the glass being provided with an opaque mask 20' in a manner which is evident from Fig. 3. In this figure the plate of glass 20 is shown comprising two plates 21 and 22 fixed to each other. The edge of one plate is cut so that a V-shaped groove 23 is formed. Instead, there may be employed only one plate in which a corresponding groove is provided. From a separate source of light 24, see Fig. 2, the glass plates 21, 22 are illuminated in the direction indicated by the arrow 25 in Fig. 3, and therefore the V-shaped groove reflects this light perpendicularly to its direction of entrance, as shown in Fig. 1 by means of the rays of light 26, 27. These rays of light are thereafter reflected onto a system of mirrors 28 and 29, placed at a 45° angle to each other, from which the rays of light are thrown onto the reading plate 30 of the arrangement, thereby passing an objective lens 31.

The reading plate 30 is made in the form of a so-called reflex sight, known per se, it being inclined in such a way with respect to the vertical, that the image of the indication on the drum 16 as well as the image of the V-shaped groove 23 are reproduced thereon as a transparency through which the target may be seen. When sighting on the target the aircraft is placed in such an inclination to the vertical and is simultaneously guided in such a way in the horizontal plane that the target coincides with a point, which is indicated in light indications on the reading plate. Such reflex sights, as known, have the property of being very easy to read, as small movements of the eye of the bombardier are automatically compensated for by a corresponding displacement of the sighting picture on the plate.

The drum 16 in Fig. 4 is shown developed in a plane. It is opaque with the exception of a number of curves 32, 33 and 34, and a scale line 35, which are formed by transparent lines on the drum. Consequently, the light from the source of light 17 which falls onto these curves or scales, respectively, is transmitted through the glass 20, this glass moreover producing a light image of rectangular form, corresponding to the opening in the mask 20', and a line 40, corresponding to the inclined surface of the V-shaped groove 23. The rectangular image and its midline 40 as well as that part of the curves and scales, respectively, falling within said image consequently are reproduced on the reading plate 30, where the image appears the same as is indicated at 36 in Fig. 4.

It should be observed, that Fig. 1 shows the arrangement in horizontal section, and hence the image created by the groove 23 during the first part of the passage of the rays is horizontal. However, the mirrors 28 and 29 turn the image of said groove, so that it is visible on the reading plate in Fig. 2 as a vertical sighting line, which indicates the horizontal projection on the target area of the course of the object dropped. Consequently the object which is dropped from the aircraft will hit the target area some place on this line. The aircraft, therefore, should be guided in such a way, that the target is maintained on the line in question.

However, the direction of the vertical component of movement of the aircraft at the moment the bomb is released, and the height over the horizontal plane both influence the point on the falling curve, at which the free falling movement is assumed to begin, and which consequently is a factor in determining the point at which the bomb hits the target area. It is for this purpose that the curves 32, 33 and 34 are made. In the image formed on the reading plate 30 these three curves will be visible as short parts of lines, corresponding to the part of the curves falling within the rectangular image 36, Fig. 4. For instance, the curves may represent different heights over the target area, so that curve 32 shall be used for a certain height, and the curves 33 and 34 for other heights. When knowing the heights for which the different curves are applicable, one may obviously without difficulty interpolate between them when using the arrangement.

The drum 16 is, as mentioned above, connected to a gyroscope, the shaft 14' of which is always vertical, and consequently the drum is movable in relation to the image 36, dependent upon the position of the aircraft relative to the vertical. The three points 37, 38 and 39 in which the curves 32, 33 and 34 cut the midline 40 in the rectangular figure 36, therefore will be displaced within this figure when the position of the aircraft relative to the vertical is changed, and the curves are with respect thereto counted in such a way, that the point 37 or 38 or 39, respectively, always indicate the point on the target area where the bomb will hit, valid for normal speed of the aircraft.

The scale 35 indicates the angle of the aircraft with the horizontal plane, but it may also be used for other purposes. When guiding the aircraft towards an object, for instance another airplane, at the same or approximately the same height, against which it is desired to fire fixed guns, it is obvious of value to be able to keep the aircraft accurately on a course directed at the other airplane. In this case the scale 35 may be arranged in such a way, that it indicates in connection with the line 40 the exact direction of movement of the aircraft in which the sight is mounted so that this aircraft moves in a straight direction towards the enemy plane, if the latter is placed exactly at the intersection of the lines 35 and 40.

Of course, it is not essential for the invention in what manner the gyroscope is driven, or of what kind the two sources of light are, respectively. It may for example be suitable to arrange one single source of light and an optic system of mirrors for the distribution of light in the two paths of rays, described above. Also in other respects apparent to a person skilled in the art the arrangement, described above, may be modified, without departing from the scope of our invention.

What is claimed:

1. In a bomb sight for an aircraft, an opaque drum bearing a transparent scale including a line representing altitude of the aircraft, means for turnably mounting said drum about a horizontal axis, a gyroscope connected to said drum to maintain the latter rotationally stationary about said axis with respect to the earth independently of the angle of the aircraft to the vertical, means having a transparent opening fixed with respect to the aircraft in a position such that said opening moves in front of said scale when the angle of the aircraft with respect to said drum changes, a member fixed with respect to the aircraft and bearing a reference line, a semi-transparent reading plate, and means for projecting said scale, the outline of said opening and said reference line onto said plate so that the reference line intersects the line of said scale within the outline of said opening.

2. In a bomb sight for an aircraft, an opaque drum bearing a transparent scale including a line representing altitude of the aircraft, means for turnably mounting said drum about a horizontal axis, a gyroscope connected to said drum to maintain the latter rotationally stationary about said axis with respect to the earth independently of the angle of the aircraft to the vertical, means fixed with respect to the aircraft and having a transparent opening in a horizontal plane so located that said opening moves in front of said scale when the angle of the aircraft with respect to said drum changes, a member fixed with respect to the aircraft and bearing a reference line, a semi-transparent reading plate, and optical means for projecting said scale, the outline of said opening and said reference line onto said plate so that the reference line intersects the line of said scale within the outline of said opening, said optical means including reflecting means for turning the image of said horizontal opening to a vertical position on said plate.

3. In a bomb sight for an aircraft, an opaque drum bearing a transparent scale including a line representing altitude of the aircraft, means for turnably mounting said drum about a horizontal axis, a gyroscope connected to said drum to maintain the latter rotationally stationary about said axis with respect to the earth independently of the angle of the aircraft to the vertical, means fixed with respect to the aircraft and having a transparent opening in a horizontal plane so located that said opening moves in front of said scale when the angle of the aircraft with respect to said drum changes, a member fixed with respect to the aircraft and bearing a reference line, a semi-transparent reading plate, and optical means for projecting said scale, the outline of said opening and said reference line onto said plate so that the reference line intersects the line of said scale within the outline of said opening, said optical means including a first mirror placed at an angle of 45° to the plane of said horizontal opening and a second mirror placed vertically and at an angle of 45° to the rays reflected from the first mirror for turning the image of said horizontal opening to a vertical position on said plate.

4. In a bomb sight for an aircraft, an opaque drum bearing a transparent scale including a line representing altitude of the aircraft, means for turnably mounting said drum about a horizontal axis, a gyroscope connected to said drum to maintain the latter rotationally stationary about said aixs with respect to the earth independently of the angle of the aircraft to the vertical, means having a transparent opening fixed with respect to the aircraft in a position such that said opening moves in front of said scale when the angle of the aircraft with respect to said drum changes, a transparent plate fixed with respect to the aircraft and having a beveled edge, means for projecting a beam of light into said plate through the edge opposite to said beveled edge so that light is reflected from the beveled edge to form a reference line, a semi-transparent reading plate, and means for projecting said scale, the outline of said opening and said reference line onto said plate so that the reference line intersects the line of said scale within the outline of said opening.

5. In a bomb sight for an aircraft, an opaque drum bearing a transparent scale including a line representing altitude of the aircraft, means for turnably mounting said drum about a horizontal axis, a gyroscope connected to said drum to maintain the latter rotationally stationary about said axis with respect to the earth independently of the angle of the aircraft to the vertical, means having a transparent opening fixed with respect to the aircraft in a position such that said opening moves in front of said scale when the angle of the aircraft with respect to said drum changes, a source of light for projecting said scale through said opening, a transparent plate fixed with respect to the aircraft and having a beveled edge, means for projecting a beam of light into said plate through the edge opposite to said beveled edge to form a reference line, a semi-transparent reading plate, and means for reflecting the light images of said scale, opening and reference line onto said plate so that the reference line intersects the line of said scale within the outline of said opening.

HERBERT HOGDAL.
JARL F:SON HOLMGREN.